(12) United States Patent
Takemura et al.

(10) Patent No.: US 6,342,109 B1
(45) Date of Patent: Jan. 29, 2002

(54) ROLLING BEARING

(75) Inventors: Hiromichi Takemura; Kazuo Sekino; Shigeru Okita; Yasuo Murakami, all of Kanagawa (JP)

(73) Assignee: NSK, Ltd., Tokyo (JP)

(*) Notice: Subject to any disclaimer, the term of this patent is extended or adjusted under 35 U.S.C. 154(b) by 0 days.

(21) Appl. No.: 09/420,836

(22) Filed: Oct. 19, 1999

(30) Foreign Application Priority Data

Oct. 22, 1998 (JP) ............................................. 10-301182
Jan. 27, 1999 (JP) ............................................. 11-018913
Jun. 16, 1999 (JP) ............................................. 11-169735

(51) Int. Cl.[7] .............................................. C23C 8/22
(52) U.S. Cl. ........................ 148/319; 428/472; 428/469; 384/913; 384/492
(58) Field of Search .................. 148/319; 428/472; 428/469; 384/913, 492

(56) References Cited

U.S. PATENT DOCUMENTS

| | | | |
|---|---|---|---|
| 5,030,017 A | * 7/1991 | Murakami et al. | 384/492 |
| 5,084,116 A | 1/1992 | Mitamura | 148/319 |
| 5,338,377 A | * 8/1994 | Mitamura et al. | 148/318 |
| 5,427,457 A | 6/1995 | Furumura et al. | 385/450 |
| 5,660,647 A | 8/1997 | Mitamura et al. | 148/319 |

FOREIGN PATENT DOCUMENTS

| | | |
|---|---|---|
| DE | 38 16 265 A1 | 12/1988 |
| DE | 41 42 313 A1 | 6/1993 |
| DE | 42 39 671 A1 | 6/1994 |
| DE | 44 06 252 A1 | 11/1994 |
| DE | 44 19 035 A1 | 12/1994 |
| DE | 42 12 966 C2 | 4/1995 |
| DE | 44 22 624 A1 | 1/1996 |
| DE | 197 07 033 A1 | 11/1997 |

OTHER PUBLICATIONS

ASM International Handbook Committee, "ASM Handbook, vol. 18, Friction, Lubrication, and Wear Technology", pp. 725–733, Mar. 1995.*

* cited by examiner

Primary Examiner—John Sheehan
Assistant Examiner—Andrew L. Oltmans
(74) Attorney, Agent, or Firm—Sughrue Mion, PLLC

(57) ABSTRACT

As a steel material for an inner race, an outer race and a rolling element constituting a rolling bearing, there is used one containing carbon (C) and chromium (Cr) in an amount of 0.65 wt % to 1.10 wt % and 2.0 wt % to 6.0 wt %, respectively. At least one of the inner race, the outer race and the rolling element is formed from the steel material. The inner race, outer race and the rolling element thus formed is then subjected to hardening, tempering and polishing. Further, a chromium oxide layer ($Cr_2O_3$) having a thickness of 5 nm to 300 nm is formed on a race track surface of at least one of the inner race, the outer race and the rolling element. If the rolling bearing is used in operation under the lubrication at a high traction coefficient with water mixed therein, finely particulate molybdenum carbide and/or vanadium carbide having a particle diameter of 50 nm to 300 nm is distributed in the matrix.

7 Claims, 2 Drawing Sheets

ROLLING BEARING

BACKGROUND OF THE INVENTION

1. Field of the Invention

The present invention relates to a rolling bearing suitable for automobile transmission which exhibits a prolonged galling live even when operated lubricated at a high traction coefficient with foreign matters mixed therein. A rolling bearing, according to the present invention, exhibits a prolonged galling life even when used with an automobile engine auxiliary machinery which is possibly contaminated by water that makes it difficult to form a lubricant layer and exhibits a prolonged galling life even when operated lubricated at a high traction coefficient with foreign matters mixed and water therein. The present invention also relates to parts and bearings of toroidal stageless transmission which gives a high tangential force at high temperatures under a high load.

2. Description of the Related Art

In general, the inner race, outer race and rolling element constituting the conventional rolling bearing are obtained by forming a high carbon chromium steel (particularly SUJ2 steel) into a predetermined shape, and then hardening and tempering the material such that the surface hardness thereof and the amount of retained austenite are adjusted to about HRC62 and about 10 vol. %, respectively.

On the other hand, an automobile automatic transmission comprises torque converter, gear mechanism, hydraulic mechanism, wet clutch, etc. incorporated therein. In order to allow these mechanisms to operate smoothly for power transmission, the rolling bearing for automatic transmission uses a lubricant having a high traction coefficient (automatic transmission fluid: ATF). Accordingly, if the foregoing conventional rolling bearing is used, the tangential force developed between the race track surface of the bearing race and the rolling surface of the rolling element increases during the operation of the automatic transmission, making it easy for lubricant layer to be destroyed and hence causing early galling on the race track surface or rolling surface.

Further, the rolling bearing mounted on an automatic transmission is liable to contamination of the lubricant provided therein by metal cuttings, shavings, burr, abrasion powder, etc. When the foregoing conventional rolling bearing is operated lubricated with these foreign matters mixed therein, these foreign matters cause dents on the race track surface of the bearing race or the rolling surface of the rolling element. With these dents as starting points, flaking (scale-like galling) occurs, drastically reducing the life of the rolling bearing.

As a conventional technique for preventing early galling on the race track surface there is disclosed in JP-A-4-28845 (The term "JP-A" as used herein means an "unexamined Japanese patent publication (kokai)") an approach involving the formation of a bearing race for rolling bearing form a steel material comprising as alloying components from 0.65 to 0.90 wt % of C, from 0.15 to 0.50 wt % of Si, from 0.15 to 1.0 wt % of Mn and 2.0 to 5.0 wt % of Cr. This technique is intended for a rolling bearing which operates subject to vibration or impact load due to high speed rotation. It is described that the cause of early galling on the race track surface in such an operating atmosphere is a mechanism where C is diffused in the material at the position where the maximum shearing stress is produced, and then fixed to form a hard and brittle white layer. It is claimed that the use of a steel material having the foregoing composition with a low C concentration and a high Cr concentration makes it difficult for such a white layer to be formed, preventing the occurrence of early galling on the race track surface.

As a conventional technique for prolonging the life of a rolling bearing operating lubricated with foreign matters mixed therein there is disclosed in JP-B-6-11899 (The term "JP-B" as used herein means an "examined Japanese patent publication") an approach which comprises subjecting a steel material comprising as alloying components from 0.4 to 0.8 wt % of C, from 0.3 to 1.2 wt % of Si, not more than 1.0 wt % of Mn, from 4.0 to 8.0 wt % of Cr and from 0.1 to 1.0 wt % of Mo as a bearing steel to carburizing or carbonitriding to form carbides or carbonitrides on the surface thereof at an area ratio of from 20% to 35%. It is claimed that in accordance with this technique, the definition of the formulation of the steel material to be used makes it possible to enhance the toughness and the resistance of the matrix to temper softening and causes finely particulate $M_{23}C_6$ or $M_7C_3$ type carbide or carbonitride to be dispersed and deposited in the surface layer to strengthen the surface layer, prolonging the life of the bearing race operating lubricated with foreign matters mixed therein.

However, such a rolling bearing operating lubricated at a high traction coefficient with foreign matters mixed therein as the foregoing rolling bearing for automobile automatic transmission cannot be expected to exhibit a prolonged galling life when the foregoing conventional technique is applied. The approach for prolonging the life of a rolling bearing operating lubricated with foreign matters mixed therein described in JP-B-6-11899 is disadvantageous in that the requirement for carburizing or carbonitriding, which adds to facility cost, raises the production cost.

Further, a rolling bearing operating lubricated at a high traction coefficient and high temperatures is liable to contamination of the lubricant by water drops which have been developed by the condensation of water vapor in the space around the bearing due to sudden temperature change in operation. Moreover, water which has been left in the automatic transmission after washing with water or the like can contaminate the lubricant. Such a rolling bearing operating lubricated at a high traction coefficient with water mixed therein is disadvantageous in that a lubricant layer can hardly be formed on the race track surface or rolling surface. The lubricant, if any, can be easily destroyed by the increased tangential force as mentioned above. Thus, such a rolling bearing cannot be expected to exhibit a prolonged galling life when the foregoing conventional technique is applied.

On the other hand, JP-B-7-110988 discloses as a rolling bearing having a prolonged life desirable for transmission or engine a rolling bearing comprising a bearing race and a rolling element at least one of which is made of an alloy steel comprising at least from 0.3 to 0.6 wt % of C and from 3 to 14 wt % of Cr and has a surface layer obtained by carburizing or carbonitriding the material and then subjecting the material to heat treatment so that it is hardened, the surface layer containing finely particulate carbides and retained austenite in an amount of from 20 to 50 vol. % and from 10 to 25 vol. %, respectively. The rolling bearing thus proposed exhibits a longer life than the conventional rolling bearing when operated lubricated with a turbine oil contaminated by foreign matters. However, this rolling bearing leaves something to be desired in the life shown when operated lubricated at a high traction coefficient with foreign matters and water mixed therein.

SUMMARY OF THE INVENTION

It is an object of the present invention to provide a rolling bearing which exhibits a prolonged galling life even when operated lubricated at a high traction coefficient with foreign matters mixed therein and lubricated at a high traction coefficient with water mixed therein.

According toe a first aspect of the present invention, a rolling bearing comprises an inner race, an outer race and a rolling element, in which at least one of the inner race, the outer race and the rolling element is obtained by forming from a steel material containing carbon (C) of 0.55 wt % to 1.10 wt % and chromium (Cr) of 2.0 wt % to 9.0 wt %, and then subjecting the material thus forming to hardening, tempering and polishing. In the rolling bearing, a chromium oxide ($Cr_2O_3$) layer having a thickness of 5 nm to 300 nm is provided on at least one of a race track surface of the inner race, a race track surface of the outer race and a rolling surface of the rolling element.

According to a second aspect of the present invention, in the rolling bearing according to the first aspect, an amount of austenite retained in at least one of the race track surface of the inner race, the race track surface of the outer race and the rolling surface of the rolling element is in the range of 15 vol. % to 25 vol. %.

According to the third aspect of the present invention, a rolling bearing comprises an inner race, an outer race and a rolling element, in which least one of the inner race, the outer race and the rolling element is obtained by forming from a steel material containing carbon (C) of 0.55 wt % to 1.10 wt %, chromium (Cr) of 2.0 wt % to 9.0 wt % and at least one of molybdenum (Mo) of 1.1 wt % to 4.0 wt %, vanadium (V) of 0.3 wt % to 2.0 wt %, and then subjecting the material thus formed to hardening, tempering and polishing. In the rolling bearing, at least one of a finely particulate molybdenum carbide and a finely particulate vanadium carbide having a particle diameter of 50 nm to 300 nm is distributed in a matrix; and a chromium oxide ($Cr_2O_3$) layer having a thickness of 5 nm to 300 nm is provided on at least one of a race track surface of the inner race, a race track surface of the outer race and a rolling surface of the rolling element.

According to a fourth aspect of the present invention, a rolling bearing comprises an inner race, an outer race and a rolling element, in which at least one of the inner race, the outer race and the rolling element is obtained by forming from a steel material containing a carbon (C) of 0.10 wt % to 0.55 wt % and a chromium (Cr) of 5.0 wt % to 14.0 wt %, and then subjecting the material thus formed to carburizing or carbonitriding, hardening, tempering and polishing. In the rolling bearing, said at least one of the inner race, the outer race and the rolling element after carburizing or carbonitriding has a surface carbon concentration of 0.7 wt % to 1.2 wt %; and an amount of austenite retained in a race track surface of the inner race, a race track surface of the outer race and a rolling surface of the rolling element is in the range of 25 vol. % to 50 vol. %; and a chromium oxide ($Cr_2O_3$) layer having a thickness of 5 nm to 300 nm is provided on at least one of a race track surface of the inner race, a race track surface of the inner race and a rolling surface of the rolling element.

According to the fifth aspect of the present invention, a rolling bearing comprises an inner race, an outer race and a rolling element, in which at least one of the inner race, the outer race and the rolling element is obtained by forming from a steel material containing carbon (C) of 0.10 wt % to 0.55 wt %, chromium (Cr) of 5.0 wt % to 14.0 wt %, and at least one of molybdenum (Mo) of 0.5 wt % to 4.0 wt % and vanadium (V) of 0.3 wt % to 2.0 wt %, and then subjecting said at least one of the inner race, the outer race and the rolling element thus formed to carburizing or carbonitriding, hardening, tempering and polishing. In the rolling bearing, at least one of a finely particulate molybdenum carbide and a finely particulate vanadium carbide having a particle diameter in the range of 50 nm to 500 nm is distributed in a matrix, said at least one of the inner race, the outer race and the rolling element after carburizing or carbonitriding has a surface carbon concentration of 0.7 wt % to 1.2 wt %; and an amount of austenite retained in a race track surface of the inner race, a race track surface of the outer race and a rolling surface of the rolling element is in the range of 25 vol. % to 50 vol. %; and a chromium oxide ($Cr_2O_3$) layer having a thickness of 5 nm to 300 nm is provided on the race track surface of the inner race, the race track surface of the outer race and a rolling surface of the rolling element.

As mentioned above, the rolling bearing according to the first aspect of present invention exhibits a prolonged galling life even in operation under the lubrication at a high traction coefficient.

In particular, the rolling bearing according to the second aspect exhibits a prolonged galling life even in operation under the lubrication at a high traction coefficient with foreign matters mixed therein.

In particular, the rolling bearing according to the third aspect exhibits a prolonged galling life even in operation under the lubrication at a high traction coefficient with water mixed therein.

In particular, the rolling bearing according to the fourth aspect exhibits a prolonged galling life even in operation under the lubrication at a high traction coefficient with foreign matters mixed therein.

In particular, the rolling bearing according to the fifth aspect exhibits a prolonged galling life even in operation under the lubrication at a high traction coefficient with foreign matters and water mixed therein.

DETAILED DESCRIPTION OF THE INVENTION

Figure 1:
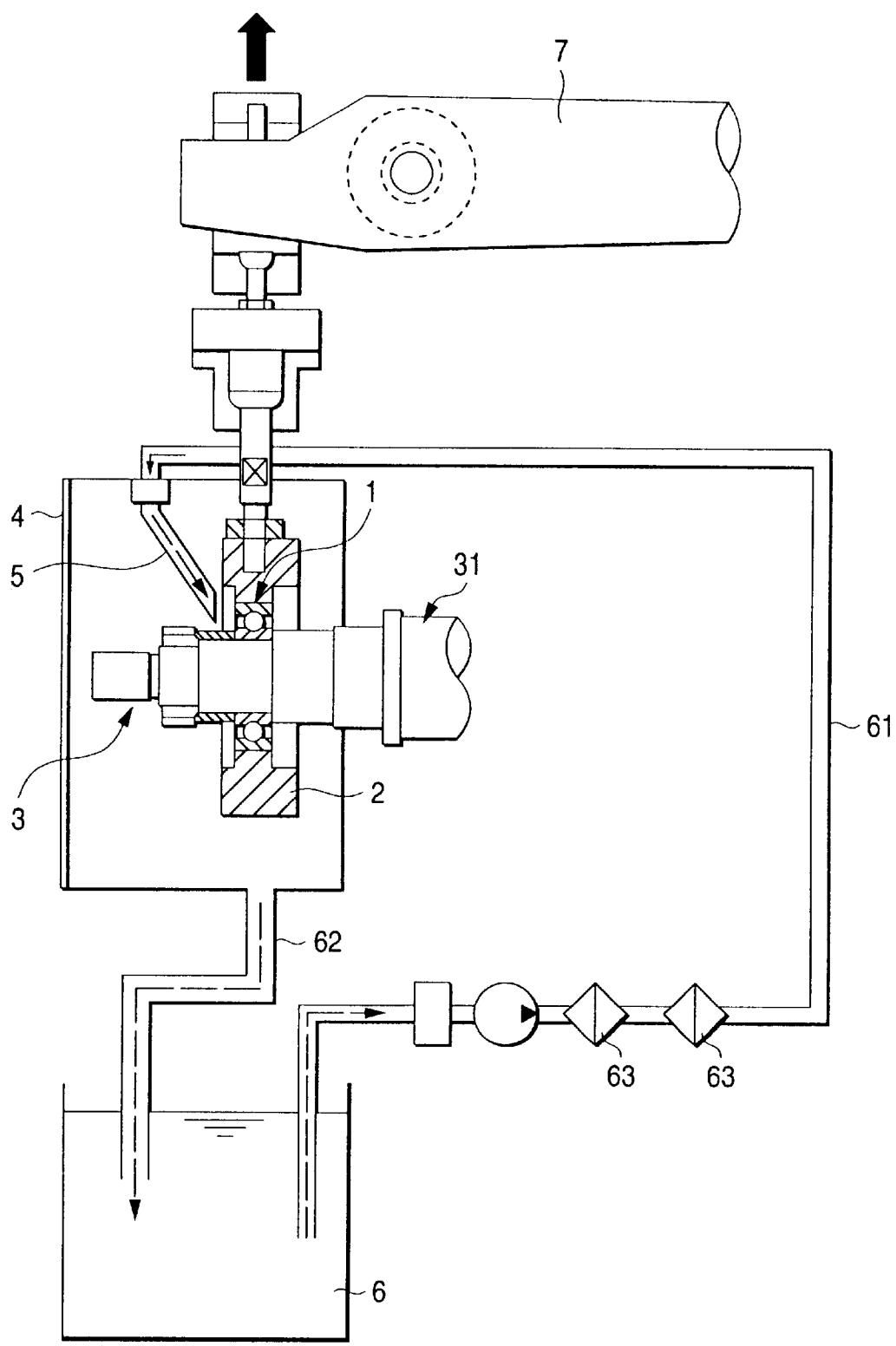
FIG. 1 is a schematic diagram illustrating the testing machine used in the galling life test in Examples.

The present invention will be described in detail as follows.

The present invention provides a rolling bearing having an inner race, an outer race and a rolling element. In the rolling bearing, at least one of the inner race, outer race and rolling element is obtained by forming from a steel material having a carbon (C) content of 0.55 wt % to 1.10 wt % and a chromium (Cr) content of 2.0 wt % to 9.0 wt %, and then subjecting the material thus formed to hardening, tempering and polishing and a chromium oxide ($Cr_2O_3$) layer having a thickness of 5 nm to 300 nm is provided on the race track surface of the bearing race and/or the rolling surface of the rolling element.

The cause of early galling on the race track surface or rolling surface during the operation under the lubrication at a high traction coefficient is a mechanism that when the lubricant layer is destroyed due to the increase of tangential force as mentioned above, water contained in the lubricant is decomposed to produce hydrogen which then penetrates into the race track surface or rolling surface. The rolling bearing according to the present invention is made of a chromium oxide layer ($Cr_2O_3$) provided on the race track surface or rolling surface to prevent the penetration of hydrogen, making it possible to prevent the occurrence of early galling on the race track surface or rolling surface under the lubrication at a high traction coefficient.

If the thickness of the chromium oxide layer ($Cr_2O_3$) falls below 5 nm, the desirable effect of preventing the penetration of hydrogen cannot be substantially exerted. On the contrary, if the thickness of the chromium oxide layer ($Cr_2O_3$) exceeds 300 nm, the texture of the chromium oxide layer becomes coarse, lessening the effect of preventing the penetration of hydrogen. A preferred range of the thickness of the chromium oxide layer is in the range of 20 nm to 200 nm. Within this range of thickness, a chromium oxide layer having a particularly dense texture can be obtained, making it possible to prevent the penetration of hydrogen into the race track surface or rolling surface more effectively.

In accordance with the technique disclosed in JP-A-4-28845, a passive layer ($FeCrO_4$) having a thickness of several nanometers is formed on the race track surface. However, such a passive layer cannot sufficiently prevent hydrogen from penetrating into the race track surface or rolling surface.

The rolling bearing according to the present invention exhibits a prolonged galling life in operation under the lubrication at a high traction coefficient as compared with the conventional rolling bearings so far as at least one of the inner race, outer race and rolling element constituting the rolling bearing meets the foregoing requirements. In particular, it is preferred that the bearing race which acts as a shaft washer (inner race or outer race) meet the foregoing requirements.

When the rolling bearing of the present invention contains austenite in the race track surface of the bearing race and/or the rolling surface of the rolling element in an amount of from not less than 15 vol. % to not move than 25 vol. %, it exhibits a remarkably prolonged galling life advantage even in operation under the lubrication not only at a high traction coefficient but also with foreign matters mixed therein.

In the rolling bearing according to the present invention, it is preferred that at least one of the inner race, outer race and rolling element be obtained by forming from a steel material having a carbon (C) content of 0.55 wt % to 1.10 wt %, a chromium (Cr) content of 2.0 wt % to 9.0 wt %, a molybdenum (Mo) content of 1.1 wt % to 4.0 wt % and/or a vanadium (V) content of 0.3 wt % to 2.0 wt %, and then subjecting the material thus formed to hardening, tempering and polishing, a finely particulate molybdenum carbide and/or vanadium carbide having a particle diameter of from not less than 50 nm to not more than 300 nm be distributed in the matrix, and a chromium oxide ($Cr_2O_3$) layer having a thickness of 5 nm to 300 nm be provided on the race track surface of the bearing race and/or the rolling surface of the rolling element.

In accordance with the foregoing rolling bearing, the finely particulate carbides distributed in the matrix adsorb hydrogen which is about to penetrate thereinto even when used under conditions such that a lubricant layer can hardly be formed to cause the chromium oxide layer ($Cr_2O_3$) provided on the race track surface and/or rolling surface to be destroyed. In this arrangement, the foregoing penetration of hydrogen into the race track surface or rolling surface can be prevented, making it possible to prevent early galling on the race track surface or rolling surface.

The distribution of such a finely particulate carbide can be obtained by keeping the material as it is at a temperature of from 1,100° C. to 1,250° C. so that it is subjected to solid solution treatment, and then allowing finely particulate molybdenum and/or vanadium carbide to be deposited. The deposition of this finely particulate carbide causes the reduction of the amount of carbon dissolved in the matrix of steel material. Therefore, the members constituting the bearing formed by a steel material having such a finely particulate carbide distributed in the matrix allow the lag of the occurrence of change in the texture by diffusion of carbon during the fatigue of the matrix. As a result, the rolling bearing exhibits a raised abrasion resistance, making it possible to prevent seizing when operated under conditions such that a lubricant layer can hardly be formed.

The finely particulate molybdenum carbide and/or vanadium carbide is preferably distributed in the matrix in a proportion of not less than 10 particles per 10 $\mu m^2$ on the race track surface and/or rolling surface.

The rolling bearing according to the present invention include the following bearings (1) to (3) as preferable modes.

(1) In a rolling bearing having an inner race, an outer race and a rolling element, at least one of the inner race, outer race and rolling element is obtained by forming from a steel material having a carbon (C) content of 0.65 wt % to 1.10 wt % and a chromium (Cr) content of 2.0 wt % to 6.0 wt %, and then subjecting the material thus formed to hardening, tempering and polishing and a chromium oxide ($Cr_2O_3$) layer having a thickness of 5 nm to 300 nm is provided on the race track surface of the bearing race (inner race and/or outer race) and/or the rolling surface of the rolling element.

This rolling bearing is particularly desirable as a rolling bearing which can operate over an extended galling life under the lubrication at a high traction coefficient.

(2) In a rolling bearing having an inner race, an outer race and a rolling element, at least one of the inner race, outer race and rolling element is obtained by forming from a steel material having a carbon (C) content of 0.65 wt % to 0.95 wt %, a silicon (Si) content of 0.05 wt % to 0.60 wt %, a manganese (Mn) content of 0.2 wt % to 1.5 wt % and a chromium (Cr) content of 3.0 wt % to 6.0 wt %, and then subjecting the material thus formed to hardening, tempering and polishing, the amount of austenite retained in the race track surface of the bearing race and/or the rolling surface of the rolling element is from not less than 15 vol. % to not more than 25 vol. %, and a chromium oxide ($Cr_2O_3$) layer having a thickness of from not less than 20 nm to not more than 200 nm is provided on the race track surface of the bearing race and/or the rolling surface of the rolling element.

In accordance with the foregoing rolling bearing, the presence of a chromium oxide layer having a dense texture makes it possible to prolong particularly the galling life of the rolling bearing in operation under the lubrication at a high traction coefficient. The predetermination of the amount of retained austenite to a range of from not less than 15 vol. % to not more than 25 vol. % makes it possible to drastically prolong the galling life of the rolling bearing in operation under the lubrication with foreign matters mixed therein. In other words, this rolling bearing is particularly desirable as a rolling bearing operating lubricated at a high traction coefficient with foreign matters mixed therein.

(3) In a rolling bearing having an inner race, an outer race and a rolling element, at least one of the inner race, outer race and rolling element is obtained by forming from a steel material having a carbon (C) content of 0.55 wt % to 0.90 wt %, a chromium (Cr) content of 4.0 wt % to 9.0 wt % (preferably, 5.0 wt % to 9.0 wt %), a molybdenum (Mo) content of 1.1 wt % to 4.0 wt % (preferably, 1.1 wt % to 3.0 wt %) and/or a vanadium (V) content of 0.3 wt % to 2.0 wt %, and then subjecting the material thus formed to hardening, tempering and polishing, a finely particulate molybdenum carbide and/or vanadium carbide having a particle diameter of 50 nm to 300 nm is distributed in the matrix, and a chromium oxide ($Cr_2O_3$) layer having a thickness of 5 nm to 300 nm is provided on the race track surface of the bearing race and/or the rolling surface of the rolling element.

This rolling bearing is particularly desirable as a rolling bearing which exhibits a prolonged galling life under the lubrication at a high traction coefficient with water mixed therein.

The action and content of the various alloying components to be contained in the steel material to be used herein will be described hereinafter.

[C: 0.55 to 1.10 wt %]

Carbon (C) is an element that provides the steel material with hardness. If the content of C falls below 0.55 wt %, it is difficult to obtain a hardness of HRC58 or higher required for rolling bearing. On the contrary, if the content of C exceeds 1.10 wt %, huge carbides can be easily produced, occasionally lowering the fatigue or impact load. Accordingly, the content of carbon is in the range of 0.55 wt % to 1.10 wt %.

The foregoing rolling bearing (1) of the present invention has a carbon content of from not less than 0.65 wt % to not more than 1.10 wt %. The foregoing rolling bearing (2) of the present invention has a carbon content in the range of 0.65 wt % to 0.95 wt %. If the content of carbon is not less than 0.65 wt %, a hardness of HRC 58 or higher can be invariably obtained. Further, if the content of carbon is not more than 0.95 wt %, the production of huge carbide can be inhibited more invariably.

The foregoing rolling bearing (3) of the present invention has a carbon content in the range of 0.55 wt % to 0.90 wt %. The foregoing rolling bearing (3) of the present invention contains a steel material having Cr, Mo and/or v incorporated therein. Therefore, if the carbon content increases, the austenite region narrows, causing carbon to be concentrated into the central part and segregated upon heat treatment. The segregated portion can then be overheated, causing cracking thereinside. Accordingly, in the rolling bearing (3) of the present invention, the upper limit of the carbon content is preferably 0.90 wt %.

[Cr: 2.0 to 9.0 wt %]

Chromium (Cr) is an element that improves the hardenability of the steel material, accelerates the spheroidization of carbide and produces a chromium oxide layer ($Cr_2O_3$). In order to predetermine the thickness of the chromium oxide layer to not less than 5 nm, it is necessary that the content of chromium be not less than 2.0 wt %. If the chromium content exceeds 9.0 wt %, the resulting steel material exhibits drastic cuttability and hence a deteriorated productivity. Accordingly, the chromium content is in the range of 2.0 wt % to 9.0 wt %.

The foregoing rolling bearing (1) of the present invention has a chromium content in the range of 2.0 wt % to 3.0 wt %. The foregoing rolling bearing (2) of the present invention has a chromium content in the range of 3.0 wt % to 6.0 wt %. If the chromium content is not more than 6.0 wt %, the resulting steel material exhibits an excellent cuttability. Further, if the chromium content is not less than 3.0 wt %, the resulting chromium oxide layer becomes more dense and rigid, exerting an enhanced effect of shielding from hydrogen.

The foregoing rolling bearing (3) of the present invention has a chromium content in the range of 4.0 wt % to 9.0 wt %, preferably 5.0 wt % to 9.0 wt %. If the chromium content is not less than 4.0 wt % (preferably not less than 5.0 wt %), the resulting chromium oxide layer becomes more dense and rigid and thus can be hardly destroyed, exerting an enhanced effect of shielding from hydrogen.

[Mo: 1.1 to 4.0 wt %]

Molybdenum (Mo) is an element that renders the steel material resistant to temper softening and is bonded to carbon to produce molybdenum carbide. In order to allow a finely particulate molybdenum carbide having a particle diameter in the range of 50 nm to 300 nm to be stably deposited and distributed in the matrix, it is necessary that the content of molybdenum be not less than 1.1 wt %. The presence of such a finely particulate molybdenum carbide provides a surface hardness that improves the abrasion resistance and exerts the foregoing effect of shielding from hydrogen.

On the contrary, if the molybdenum content exceeds 4.0 wt %, the foregoing effect is saturated. Further, the workability of the resulting steel material can be deteriorated. Accordingly, the molybdenum content is in the range of 1.1 wt % to 4.0 wt %, preferably 1.1 wt % to 3.0 wt %.

[V: 0.3 to 2.0 wt %]

Vanadium (V) is an element that is deposited on the crystal boundary to inhibit the increase of the size of crystalline particles and is bonded to carbon to produce a finely particulate vanadium carbide. In order to allow a finely particulate vanadium carbide having a particle diameter in the range of 50 nm to 300 nm to be stably deposited and distributed in the matrix, it is necessary that the content of vanadium be not less than 0.3 wt %. The presence of such a finely particulate vanadium carbide provides a surface hardness that improves the abrasion resistance and exerts the foregoing effect of shielding from hydrogen.

On the contrary, if the vanadium content exceeds 2.0 wt %, the vanadium carbide is deposited on the crystal boundary, deteriorating the workability or various mechanical properties of the steel material. Accordingly, the vanadium content is in the range of 0.3 wt % to 2.0 wt %. In the case where only vanadium is incorporated free of molybdenum, the vanadium content is preferably in the range of 0.5 wt % to 2.0 wt %.

[Si: 0.05 to 0.60 wt %]

Silicon (Si) is an element that accelerates the delay in the texture change and improves the hardenability of the steel material. If the content of silicon falls below 0.05 wt %, the foregoing effect can be sufficiently exerted. On the contrary, if the silicon content exceeds 0.50 wt %, the resulting steel material exhibits a drastically deteriorated workability. Accordingly, the silicon content is preferably in the range of 0.05 wt % to 0.60 wt %.

[Mn: 0.2 to 1.5 wt %]

Manganese (Mn) is an element that improves the hardenability of the steel material. If the content of manganese falls below 0.2 wt %, the resulting steel material exhibits an insufficient hardenability. On the contrary, if the content of manganese exceeds 1.5 wt %, the resulting steel material exhibits a deteriorated workability. Accordingly, the manganese content is preferably in the range of 0.2 wt % to 1.5 wt %.

[P, S, O]

Phosphorus (P) is an element that reduces the rolling life and toughness of the steel material. Therefore, the content of phosphorus is preferably not less than 0.02 wt %. Sulfur (S) is an element that improves the cuttability of the steel material. Since sulfur is bonded to manganese to produce a sulfuride inclusion that reduces the rolling life of the steel material, its content is preferably not more than 0.02 wt %. Oxygen (O) is an element that produces an oxide inclusion in the steel material to reduce the rolling life thereof. Accordingly, the content of oxygen is preferably not more than 0.0010 wt %.

The present invention also provides a rolling bearing having an inner race, an outer race and a rolling element, in that at least one of the inner race, outer race and rolling element is obtained by forming from a steel material having a carbon (C) content of 0.10 wt % to 0.55 wt % and a chromium (Cr) content of 5.0 wt % to 14.0 wt %, and then subjecting the material thus formed to carburizing or carbonitriding, hardening, tempering and polishing, the material which has been carburized or carbonitrided has a surface carbon concentration of 0.7 wt % to 1.2 wt %, the amount of austenite retained in the race track surface of the bearing race and/or the rolling surface of the rolling element is from not less than 25 vol. % to not more than 50 vol. %, and a chromium oxide ($Cr_2O_3$) layer having a thickness of 5 nm to 300 nm is provided on the race track surface of the bearing race and/or the rolling surface of the rolling element.

As previously mentioned, when a rolling bearing is operated lubricated with foreign matters mixed therein, these foreign matters cause dents to be developed on the race track surface of the bearing race or the rolling surface of the rolling element. When stress is concentrated onto the edge of these dents, microcracking occurs to cause early galling. In accordance with the arrangement of the rolling bearing of the present invention, the predetermination of the amount of retained austenite in the race track surface of the bearing race and/or the rolling surface of the rolling element to the range of from not less than 25 vol. % to not more than 50 vol. % allows the following effects to be exerted, lessening the concentration of stress onto the edge of these dents. As a result, early galling on the race track surface of the bearing race and the rolling surface of the rolling element in operation under the lubrication with foreign matters mixed therein can be prevented.

In other words, austenite originally has a soft texture (e.g., about Hv 300). However, austenite retained in the surface layer of the steel material undergoes martensite transformation and hardening when induced by energization such as work. The race track surface or rolling surface containing retained austenite in an amount of 25 vol. % to 50 vol. % undergoes the foregoing transformation due to deformation energy applied thereto when brought in rolling contact with the opposing surface (rolling surface or race track surface). During this course, the concentration of stress onto the edge of the foregoing dents is relaxed.

This rolling bearing also has a chromium oxide layer ($Cr_2O_3$) having a thickness in the range of 5 nm to 300 nm provided on the race track surface of the bearing race and/or the rolling surface of the rolling element. In this arrangement, the penetration of hydrogen, which causes early galling on the race track surface or rolling surface in operation under the lubrication at a high traction coefficient, can be prevented. As a result, the occurrence of early galling on the race track surface or rolling surface in operation under the lubrication at a high traction coefficient can be prevented.

The reason why the carbon and chromium contents and the surface carbon concentration of the steel material to be used in the rolling bearing carbon are defined will be described hereinafter.

[Surface carbon concentration: 0.7 to 1.2 wt %]

In order to obtain a surface hardness of HRC 58 or higher required for rolling bearing, it is necessary that the surface carbon concentration be not less than 0.7 wt %. If the surface carbon concentration exceeds 1.2 wt %, huge carbide can be easily produced. The portion where huge carbide has been produced can act as a starting point of cracking.

In the case where carbonitriding is effected, the surface nitrogen concentration is preferably in the range of 0.05 wt % to 0.50 wt %. If the surface nitrogen concentration is not less than 0.05 wt %, the resulting steel material exhibits an enhanced tempering resistance, making it easy for finely particulate carbide to be dispersed and deposited. As a result, the surface brittle crack strength is raised. Further, if the surface nitrogen concentration exceeds 0.50 wt %, the resulting steel material exhibits an enhanced abrasion resistance but can hardly be polished and hence exhibits a deteriorated brittle crack strength.

During carburizing or carbonitriding, diffusive hydrogen penetrates into the interior of the material. However, the material which has been carburized or carbonitrided can be heated in a vacuum furnace to reduce the content of diffusive hydrogen in the material to not more than 0.1 ppm and hence enhance the brittleness thereof.

[C: 0.10 to 0.55 wt %]

Carbon (C) is an element that provides the steel material with hardness. This rolling bearing exhibits a surface carbon concentration of 0.7 wt % to 1.2 wt % developed by carburizing or carbonitriding. If the content of carbon in the steel material to be used falls below 0.10 wt %, carburizing or carbonitriding for predetermining the surface carbon concentration to the foregoing range takes much time. On the contrary, if the content of carbon in the steel material exceeds 0.55 wt %, the resulting steel material can exhibit a deteriorated toughness in the core thereof and hence a deteriorated impact resistance.

[Cr: 5.0 to 14.0 wt %]

Chromium (Cr) is an element that improves the hardenability of the steel material, accelerates the spheroidization of carbide and produces a chromium oxide layer ($Cr_2O_3$). This rolling bearing needs to have a chromium content of not less than 5.0 wt % to have a chromium oxide layer to a thickness of not less than 5 nm. If the chromium content exceeds 14.0, the resulting steel material exhibits a drastically deteriorated cuttability and is liable to production of huge chromium carbide having a particle diameter of 10 $\mu$m. When huge chromium carbide is produced, the resulting chromium oxide layer is nonuniform, making it easy for chromium oxide layer to be destroyed.

Accordingly, this rolling bearing exhibits a prolonged galling life in operation under the lubricant at a high traction coefficient with foreign matters mixed therein.

Further, this rolling bearing preferably contains silicon incorporated in the steel material used in the following range and manganese incorporated in the steel material used in the foregoing range. Moreover, the content of oxygen is preferably not more than 0.001 wt % as previously mentioned. The content of sulfur and phosphorus are each preferably not more than 0.02 wt % as previously mentioned.

As previously mentioned, silicon (Si) is an element that accelerates the delay in the texture change and improves the hardenability of the steel material. This rolling bearing comprises carbon (C) incorporated in the steel material used in an amount of from 0.10 to 0.55 wt %. Therefore, if the content of silicon falls below 0.10 wt %, the foregoing effect cannot be sufficiently exerted. Since the above defined carbon content is low enough, the resulting steel material exhibits an improved cold-workability. Therefore, even if the silicon content exceeds 0.60 wt %, the resulting steel material exhibits a good workability. However, if the silicon content exceeds 1.40 wt %, the resulting steel material exhibits a deteriorated workability. Accordingly, the silicon content is preferably in the range of 0.10 wt % to 1.40 wt %.

The present invention further provides a rolling bearing having an inner race, an outer race and a rolling element, in that at least one of the inner race, outer race and rolling element is obtained by forming from a steel material having a carbon (C) content of 0.10 wt % to 0.55 wt %, a chromium (Cr) content of 5.0 wt % to 14.0 wt %, a molybdenum (Mo) content of 0.5 wt % to 4.0 wt % and/or a vanadium (V) content of 0.3 wt % to 2.0 wt %, and then subjecting the material thus formed to carburizing or carbonitriding, hardening, tempering and polishing, a finely particulate molybdenum carbide and/or vanadium carbide having a particle diameter of 50 nm to 300 nm is distributed in the matrix, the material which has been carburized or carbonitrided has a surface carbon concentration of 0.7 wt % to 1.2 wt %, the amount of austenite retained in the race track surface of the bearing race and/or the rolling surface of the rolling element is from 25 vol. % to 50 vol. %, and a chromium oxide ($Cr_2O_3$) layer having a thickness of 5 nm to 300 nm is provided on the race track surface of the bearing race and/or the rolling surface of the rolling element.

In accordance with the foregoing rolling bearing, the finely particulate molybdenum and/or vanadium carbides distributed in the matrix adsorb hydrogen which is about to penetrate thereinto even when used under conditions such that a lubricant layer can hardly be formed to cause the chromium oxide layer ($Cr_2O_3$) provided on the race track surface and/or rolling surface to be destroyed. In this arrangement, the foregoing penetration of hydrogen into the race track surface or rolling surface can be prevented even in operation under the lubrication at a high traction coefficient with water mixed therein, making it possible to prevent early galling on the race track surface or rolling surface.

The distribution of such a finely particulate carbide can be obtained by the method as previously mentioned. As previously mentioned, the members constituting the bearing formed by a steel material having such a distribution in the matrix allow the lag of the occurrence of change in the texture by diffusion of carbon during the fatigue of the matrix. As a result, the rolling bearing exhibits a raised abrasion resistance, making it possible to prevent seizing when operated under conditions such that a lubricant layer can hardly be formed. The finely particulate molybdenum carbide and/or vanadium carbide is preferably distributed in the matrix in a proportion of not less than 10 particles per 10 $\mu m^2$ on the race track surface and/or rolling surface as previously mentioned.

In this rolling bearing, the particle diameter of the finely particulate molybdenum carbide and/or vanadium carbide falls within the range of 50 nm to 500 nm. The molybdenum carbide and/or vanadium carbide particles in the matrix grow during carburizing or carbonitriding. In this rolling bearing, the foregoing effect of adsorbing hydrogen and improving abrasion resistance can be exerted so far as the particle diameter of the foregoing finely particulate carbides is not more than 500 nm even if it exceeds 300 nm.

In accordance with the arrangement of this rolling bearing, the predetermination of the amount of retained austenite in the race track surface of the bearing race and/or the rolling surface of the rolling element in the range of 25 vol. % to 50 vol. % allows the foregoing effects to be exerted, lessening the concentration of stress onto the edge of the foregoing dents. As a result, early galling on the race track surface of the bearing race and the rolling surface of the rolling element in operation under the lubrication with foreign matters mixed therein can be prevented. Further, the reduction of hardness accompanying the rise in the content of retained austenite can be made up for by the finely particulate molybdenum carbide and/or vanadium carbides distributed in the matrix.

The reason why the molybdenum (Mo) content in this rolling bearing carbon is defined will be described hereinafter. The reason why the vanadium (V) content in this rolling bearing carbon is defined is as previously mentioned.
[Mo: 0.5 to 4.0 wt %]

As previously mentioned, molybdenum (Mo) is an element that renders the steel material resistant to temper softening and is bonded to carbon to produce molybdenum carbide. In the case where the content of carbon (C) in the steel material used is in the range of 0.25 to 0.55 wt %, the molybdenum content is preferably not less than 1.1 wt % to allow the finely particulate molybdenum carbide having a particle diameter of 50 nm to 500 nm to be stably deposited and distributed in the matrix.

However, if the content of carbon (C) in the steel material used is from 0.10 to 0.20 wt %, the carbon concentration in the matrix tends to lower due to the deposition of finely particulate molybdenum carbide. In order to inhibit this phenomenon, the molybdenum content is preferably less than 1.1 wt % (e.g., about 0.5 wt %).

On the contrary, if the molybdenum content exceeds 4.0 wt %, the foregoing effect is saturated. Further, the resulting steel material can exhibit a deteriorated workability. In these respects, this rolling bearing (C: 0.10 to 0.55 wt %) comprises molybdenum incorporated in the steel material used in an amount of 0.5 wt % to 4.0 wt %.

As mentioned above, this rolling bearing exhibits a prolonged galling life in operation under the lubrication at a high traction coefficient with foreign matters and water mixed therein.

Examples of the present invention will be described hereinafter.

EXAMPLES 1 TO 9 and

Comparative Examples 1 to 6

A steel material containing carbon (C), silicon (Si), manganese (Mn) and chromium (Cr) in proportions (wt %) set forth in Table 1 below, phosphorus (P) and sulfur (S) each in a proportion of not more than 0.02 wt %, oxygen (O) in a proportion of not more than 0.0010 wt %, and the balance of iron (Fe) was used to produce an inner race and an outer race for deep race track surface ball bearing (JIS model number: 6206; outer diameter: 62 mm; inner diameter: 30 mm; width: 16 mm).

Subsequently, the inner race and outer race thus produced were subjected to hardening and tempering so that the surface hardness (HRC) and amount of retained austenite ($\gamma R$) were adjusted as set forth in Table 1 below. Using an alumina-based grinding mill or CBN grinding mill, the inner race and outer race were polished at the race track surface formed thereon at a high rotary speed so that the surface roughness of the race track surface was from 0.01 to 0.04 $\mu mRa$. The inner race and outer race thus polished were then measured for the properties of chromium oxide layer ($Cr_2O_3$) formed on the race track surface. The measurements are set forth in Table 1 below.

TABLE 1

|  |  | C | Si | Mn | Cr | Cr$_2$O$_3$ layer (nm) | HRC | %γR |
|---|---|---|---|---|---|---|---|---|
| Example No. | 1 | 0.65 | 0.60 | 0.31 | 6.0 | 300 | 63 | 10 |
|  | 2 | 0.84 | 0.23 | 0.61 | 5.1 | 225 | 60 | 13 |
|  | 3 | 0.79 | 0.38 | 1.5 | 3.5 | 175 | 58 | 0 |
|  | 4 | 1.10 | 0.05 | 0.45 | 2.0 | 5 | 63 | 9 |
|  | 5 | 0.92 | 0.25 | 0.2 | 4.3 | 87 | 59 | 4 |
|  | 6 | 1.05 | 0.47 | 0.45 | 2.6 | 13 | 63 | 10 |
|  | 7 | 0.69 | 0.33 | 0.32 | 3.5 | 20 | 62 | 25 |
|  | 8 | 0.81 | 0.41 | 0.49 | 4.9 | 79 | 61 | 15 |
|  | 9 | 0.95 | 0.33 | 0.29 | 5.7 | 200 | 60 | 20 |
| Comparative Example No. | 1 | 0.93 | 0.34 | 0.41 | <u>1.5</u> | <u>1</u> | 62 | 8 |
|  | 2 | <u>1.24</u> | 0.25 | 0.43 | 2.9 | 10 | 65 | 11 |
|  | 3 | <u>0.59</u> | 0.31 | 0.22 | 3.8 | 15 | 56 | 5 |
|  | 4 | 0.88 | <u>0.02</u> | 0.89 | 4.0 | <u>4</u> | 60 | 9 |
|  | 5 | 0.76 | 0.58 | <u>0.05</u> | 2.0 | <u>2</u> | 62 | 12 |
|  | 6 | 0.95 | 0.31 | 0.42 | 3.4 | <u>500</u> | 60 | 10 |

As a rolling element there was used one obtained by a process of forming a ball having a diameter of ⅜ inch from a second kind of high carbon chromium bearing steel (SUJ2), and then subjecting the ball to hardening and tempering so that the surface hardness (HRC), the amount of retained austenite (γR) and the surface roughness of the race track surface were adjusted to 62, 10 vol. % and from 0.003 to 0.010 μmRa, respectively.

Rolling bearings composed of these inner races and outer races thus obtained (Examples 1 to 9 and Comparative Examples 1 to 6) and the foregoing rolling element were each mounted on a testing machine shown in FIG. 1. Under these conditions, these rolling bearings were then examined for galling life in operation under the lubrication at a high traction coefficient.

This testing machine has a housing 2 having a rolling bearing 1 mounted therein. The entire housing 2 and an axis 3 except the end portion 31 are covered by a shrouding member 4. Provided at the top of the interior of the shrouding member 4 is an oil feed nozzle 5 through which the lubricant is supplied into the interior of the rolling bearing 1. The oil feed nozzle 5 is arranged such that it receives the lubricant from an oil tank 6 through a pipe 61. The lubricant which has dropped onto the bottom of the shrouding member 4 is returned to the oil tank 6 through a waste oil pipe 62. The pipe 61 can be provided with a filter 63 for removing foreign matters from the lubricant at the upper stream thereof. Provided above the shrouding member 4 is a load lever 7 by which a load is applied to the rolling bearing 1 through the housing 2.

As the lubricant there was used a commercially available traction oil having a maximum traction coefficient (μ) of 0.09 at 40° C. and 0.07 at 100° C. and a dynamic viscosity of 30.8 cSt at 40° C. and 5.31 cSt at 100° C. as determined at a circumferential speed of 4.1 m/s and a percent slippage of 5% using a two-cylinder testing machine. Referring to the testing conditions, the testing load Fr was 580 kgf (P/C=0.3 according to JIS), the testing temperature was 100° C., the rotary speed was 3,900 rpm, and the inner race was rotated.

In some detail, steel beads having a hardness Hv of 530 and a size of from 44 to 74 μm were added to 1000 cc of the lubricant in the oil tank 6. The rolling bearing 1 in the shrouding member 4 was then allowed to operate for 3 minutes while being supplied with the lubricant. In other words, the rolling bearing 1 was allowed to rotate under the lubrication at a high traction coefficient with foreign matters mixed therein so that initial dents were developed on the race track surface and/or the rolling surface.

Subsequently, the rolling bearing 1 was removed from the testing machine, and then cleaned. The outer race and rolling element were then replaced by new ones free of dents. The inner race thus initially dented was continued to be used. The rolling bearing 1 was then mounted on the testing machine. The filter 63 was mounted on the pipe 61. Under these conditions, the rolling bearing 1 in the shrouding member 4 was allowed to rotate while being supplied with the lubricant free of foreign matters. During the rotary test, vibration developed on the bearing was measured. When the vibration during rotation reached 5 times the initial value, the test was suspended to see if flaking occurred. 10 sets of bearings were tested for each of the examples and comparative examples.

Figure 2:
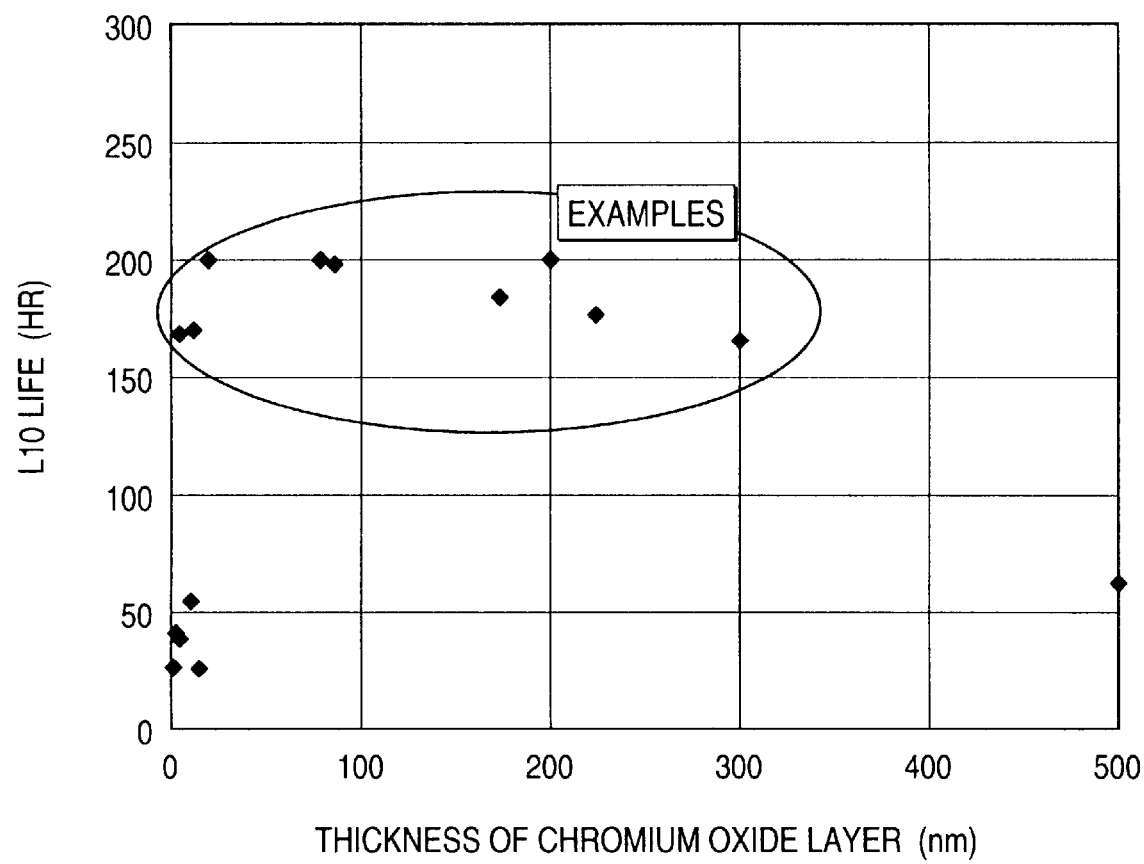
FIG. 2 is a graph illustrating the relationship between the thickness of chromium oxide layer and the evaluation time (L10 life) determined from the results of test in Examples.

If the test was suspended, the rotation time required until then was used for evaluation (galling life). For those which have a calculated life of 160 hours and thus were tested for 200 hours during which the vibration didn't reach 5 times the initial value, examination was made to see if flaking occurred after 200 hours of rotation. Thus, 200 hours were used for evaluation. The results are set forth in Table 2 below. The relationship between the thickness of chromium oxide layer and the evaluation time (L10 life) obtained from the results is shown in FIG. 2.

TABLE 2

|  |  | Evaluation time L10 (hr) | Occurrence of galling | Form of galling |
|---|---|---|---|---|
| Example No. | 1 | 165 | 3/10 inner race galled | Started from the core |
|  | 2 | 176 | 2/10 inner race galled | Started from the core |
|  | 3 | 184 | 5/10 outer race galled | Started from the surface (dent) |
|  | 4 | 169 | 3/10 inner race galled | Started from the core |
|  | 5 | 198 | 4/10 outer race galled | Started from the surface (dent) |
|  | 6 | 171 | 3/10 inner race galled | started from the core |
|  | 7 | 200 | Not galled | — |
|  | 8 | 200 | Not galled | — |
|  | 9 | 200 | Not galled | — |
| Comparative Example No. | 1 | 27 | 10/10 inner race galled | Started from the core |
|  | 2 | 55 | 10/10 inner and outer races galled | Started from the core |
|  | 3 | 26 | 10/10 inner and outer races galled | Started from the core |
|  | 4 | 39 | 10/10 inner race galled | Started from the core |
|  | 5 | 41 | 10/10 inner race galled | Started from the core |
|  | 6 | 63 | 10/10 inner race galled | Started from the core |

As can be seen in the table above, since Examples 1 to 6 each is formed of a steel material meeting the requirements of the present invention and hence have a chromium oxide layer having a thickness of 5 nm to 300 nm, they are rendered insusceptible by the chromium oxide layer to penetration of hydrogen and hence exhibit a remarkably prolonged evaluation time as compared with Comparative Examples 1 to 6. However, these steel material each have retained austenite in an amount of less than 15 vol. %. Thus, 2 to 5 of 10 samples underwent galling.

Among Examples 1 to 6, Examples 3 and 5 each have a chromium oxide layer having a thickness falling within the desirable range (from 20 nm to 200 nm) and thus are drastically rendered by the chromium oxide layer to penetration of hydrogen. Thus, these steel materials exhibit a prolonged evaluation time as compared with Examples 1, 2, 4 and 6, which fall outside the desirable range in respect to the thickness of the chromium oxide layer. Examples 1, 2, 4 and 6 were examined for microstructure of section of the inner race which underwent galling. As a result, microcrack as well as whitening of texture were confirmed. Examples 3 and 5 underwent galling on the race track surface the outer race starting from the initial dents.

Examples 7 to 9 each is formed of a steel material meeting the requirements of the present invention and have a chromium oxide layer having a thickness of 20 nm to 200 nm and a retained austenite content of 15 vol. % to 25 vol. %. Thus, these steel materials exhibited an evaluation time of 200 hours during which none of 10 samples underwent galling. In other words, these steel materials were rendered sufficiently insusceptible by the chromium oxide layer to penetration of hydrogen and rendered insusceptible by the high retained austenite content to spread of initial dents and thus exhibited a prolonged galling life.

Comparative Example 1 is formed of SUJ2 steel, which deviates from the scope of the present invention, and has a chromium oxide layer having a thickness as small as 1 nm and a retained austenite content of as small as 8 vol. %. Thus, the steel material of Comparative Example 1 exhibited an evaluation time of as short as ⅙ of the calculated life, and all the ten samples underwent galling. These samples were examined for microstructure of section of the inner race which underwent galling. As a result, microcrack as well as whitening of texture were confirmed.

Comparative Example 2 has a chromium oxide layer having a thickness of 10 nm but contains carbon incorporated in the steel material used in a large amount. Thus, huge carbides were produced on the surface of the steel material, and the chromium oxide layer was partially destroyed. These samples were examined for microstructure of section of the inner race which underwent galling. As a result, microcrack as well as whitening of texture were confirmed.

Comparative Example 3 has a chromium oxide layer having a thickness of 15 nm but contains carbon incorporated in the steel material used in a small amount. Thus, the surface hardness of the race track surface was insufficient, and the resulting plastic deformation of the race track surface caused the reduction of galling life.

Comparative Example 4 contains silicon incorporated in the steel material used in a small amount. Thus, the resulting cutting resistance during polishing was reduced, inhibiting the generation of heat on the polished surface of the steel material. As a result, the thickness of the chromium oxide layer was reduced to 4 nm, making it substantially impossible for the chromium oxide layer to exert an effect of preventing the penetration of hydrogen.

Comparative Example 5 contains manganese incorporated in the steel material used in a small amount. Thus, the resulting cutting resistance during polishing was reduced, inhibiting the generation of heat on the polished surface of the steel material. As a result, the thickness of the chromium oxide layer was reduced to 2 nm, making it substantially impossible for the chromium oxide layer to exert an effect of preventing the penetration of hydrogen.

Comparative Example 6 contains a steel material meeting the requirements of the present invention but has a chromium oxide layer having a thickness of as great as 500 nm. The resulting chromium oxide layer had a coarse texture, making it substantially impossible for the chromium oxide layer to exert an effect of preventing the penetration of hydrogen.

As can be seen in the foregoing results, a rolling bearing can be rendered insusceptible to penetration of hydrogen by a chromium oxide layer and thus exhibit a prolonged galling life in operation under the lubrication at a high traction coefficient with foreign matters mixed therein so far as the steel material used meets the requirements of the present invention and a chromium oxide layer having a thickness of from not less than 5 nm to not more than 300 nm is provided on the race track surface. It can be also seen that the predetermination of the retained austenite to a range of from not less than 15 vol. % to not more than 25 vol. % makes it possible to inhibit the spread of initial dents and hence drastically prolong the galling life in operation under the lubrication at a high traction coefficient with foreign matters mixed therein.

EXAMPLES 11 TO 19 and

Comparative Examples 11 to 16

A steel material containing carbon (C), silicon (Si), manganese (Mn), chromium (Cr), molybdenum (Mo) and vanadium (V) in proportions (wt %) set forth in Table 3 below, phosphorus (P) and sulfur (S) each in a proportion of not more than 0.02 wt %, oxygen (O) in a proportion of not more than 0.0010 wt %, and the balance of iron (Fe) was used to produce an inner race and an outer race for deep race track surface ball bearing (JIS model number: 6206; outer diameter: 62 mm; inner diameter: 30 mm; width: 16 mm).

The inner and outer races were produced by keeping the steel material as it is at a temperature of from 1,100° C. to 1,250° C. in a nonoxidizing atmosphere so that it was subjected to solid solution treatment, whereby finely particulate molybdenum and vanadium carbides are deposited and distributed in the matrix, and then cutting the material except for Comparative Example 15. Subsequently, the inner and outer races were subjected to hardening and tempering so that the surface hardness (HRC) thereof and the retained austenite content (γR) were adjusted to the values set forth in Table 3 below. Comparative Example 15 was subjected to hardening and tempering free from solid solution treatment.

Using an alumina-based grinding mill or CBN grinding mill, these inner and outer races were polished at the race track surface at a high rotary speed so that the surface roughness of the race track surface was from 0.01 to 0.04 μmRa. The inner and outer races thus polished were each measured for the properties of chromium oxide layer ($Cr_2O_3$) formed on the race track surface. The results are set forth in Table 3 below.

The finely particulate molybdenum carbide and/or vanadium carbide distributed in the matrix was then observed under a transmission electron microscope. The carbide particles were subjected to image analysis to confirm the average particle diameter and the number of particles. The average particle diameter is set forth in Table 3 below.

TABLE 3

|  |  | Chemical component (%) | | | | | | Chromium oxide layer (nm) | Mo, V carbides (nm) | HRC | γR (%) |
|---|---|---|---|---|---|---|---|---|---|---|---|
|  |  | C | Si | Mn | Cr | Mo | V |  |  |  |  |
| Example No. | 11 | 0.82 | 0.10 | 0.31 | 4.0 | 4.0 | 1.2 | 5 | 300 | 61 | 0 |
|  | 12 | 0.90 | 0.60 | 0.25 | 5.1 | — | 2.0 | 134 | 235 | 58 | 0 |
|  | 13 | 0.62 | 0.25 | 0.48 | 7.2 | 2.2 | — | 98 | 68 | 60 | 0 |
|  | 14 | 0.78 | 0.23 | 0.35 | 8.0 | — | 0.5 | 106 | 106 | 61 | 8 |
|  | 15 | 0.65 | 0.43 | 0.61 | 5.0 | 1.1 | — | 24 | 250 | 58 | 12 |
|  | 16 | 0.55 | 0.55 | 1.50 | 9.0 | 1.3 | 0.5 | 300 | 50 | 58 | 8 |
|  | 17 | 0.72 | 0.21 | 0.35 | 7.5 | 1.4 | 1.5 | 200 | 143 | 62 | 15 |
|  | 18 | 0.61 | 0.35 | 0.40 | 6.9 | — | 0.3 | 8 | 59 | 59 | 11 |
|  | 19 | 0.77 | 0.33 | 0.29 | 5.8 | 3.0 | — | 67 | 185 | 63 | 9 |
| Comparative Example No. | 11 | 0.93 | 0.32 | 0.41 | 1.5 | 0.2 | — | 1 | 810 | 61 | 10 |
|  | 12 | 0.49 | 0.21 | 0.35 | 5.1 | 1.5 | 1.0 | 51 | 155 | 55 | 8 |
|  | 13 | 1.25 | 0.33 | 0.18 | 4.9 | — | 0.5 | 25 | 79 | 65 | 15 |
|  | 14 | 0.80 | 0.42 | 0.70 | 8.0 | 0.5 | — | 105 | 500 | 62 | 8 |
|  | 15 | 0.65 | 0.34 | 0.15 | 2.0 | — | — | 2 | — | 58 | 9 |
|  | 16 | 0.88 | 0.32 | 0.43 | 1.4 | — | 0.7 | 1 | 275 | 59 | 11 |

As a rolling element there was used one obtained by a process of forming a ball having a diameter of 3/8 inch from a second kind of high carbon chromium bearing steel (SUJ2), and then subjecting the ball to hardening and tempering so that the surface hardness (HRC), the amount of retained austenite (γR) and the surface roughness of the race track surface were adjusted to 63, 10 vol. % and from 0.003 to 0.010 μmRa, respectively.

Rolling bearings having these inner and outer races thus obtained (Examples 11 to 19 and Comparative Examples 11 to 16) and the foregoing rolling element was then mounted on the testing machine of FIG. 1 described in the first embodiment. Thus, the rolling bearings were examined for galling life in operation under the lubrication at a high traction coefficient with water mixed therein.

As the lubricant there was used a commercially available traction oil having a maximum traction coefficient (μ) of 0.09 at 40° C. and 0.07 at 100° C. and a dynamic viscosity of 30.8 cSt at 40° C. and 5.31 cSt at 100° C. as determined at a circumferential speed of 4.1 m/s and a percent slippage of 5% using a two-cylinder testing machine. A mixture of the foregoing lubricant with tap water in an amount of 5 vol. % was then charged in the oil tank 6. The lubricant was circulated through the pipe 61 provided with the filter 63. In this arrangement, the lubricant mixed with water was supplied into the rolling bearing 1 in the shrouding member 4 free from the contamination by foreign matters.

Referring to the testing conditions, the testing load Fr was 580 kgf (P/C=0.3 according to JIS), the testing temperature was 100° C., the rotary speed was 3,900 rpm, and the inner race was rotated.

Under these conditions, the rolling bearing 1 was allowed to rotate while being supplied with the lubricant from the oil tank 6. During the rotary test, vibration developed on the bearing was measured. When the vibration during rotation reached 5 times the initial value, the test was suspended to see if flaking occurred. 10 sets of bearings were tested for each of the examples and comparative examples.

If the test was suspended, the rotation time required until then was used for evaluation (galling life). For those which have a calculated life of 160 hours and thus were tested for 200 hours during which the vibration didn't reach 5 times the initial value, examination was made to see if flaking 200 hours of rotation. Thus, 200 hours were used for evaluation. The results are set forth in Table 4 below.

TABLE 4

|  |  | Evaluation time L10 (hr) | Occurrence of galling | Form of galling |
|---|---|---|---|---|
| Example No. | 11 | 155 | 3/10 inner race galled | Started from the core |
|  | 12 | 200 | Not galled | — |
|  | 13 | 200 | Not galled | — |
|  | 14 | 200 | Not galled | — |
|  | 15 | 200 | Not galled | — |
|  | 16 | 143 | 3/10 inner race galled | started from the core |
|  | 17 | 200 | Not galled | — |
|  | 18 | 125 | 2/10 seized | Started from the surface (seizing) |
|  | 20 | 200 | Not galled | — |
| Comparative Example No. | 11 | 25 | 10/10 inner race galled | Started from the core |
|  | 12 | 20 | 10/10 inner ring galled | Started from the core |
|  | 13 | 49 | 10/10 inner race galled | Started from the core |
|  | 14 | 50 | 10/10 inner race galled | Started from the core |
|  | 15 | 31 | 10/10 inner race galled | Started from the core |
|  | 16 | 53 | 10/10 inner race galled | Started from the core |

As can be seen in the table above, since Examples 11 to 19 each is formed of a steel material meeting the requirements of the present invention, have a chromium oxide layer having a thickness of from not less than 5 nm to not more than 300 nm and have finely particulate manganese carbide and/or vanadium carbide having a particle diameter of from not less than 50 nm to not more than 300 nm distributed in the matrix, they exhibit a drastically prolonged galling life as compared with Comparative Examples 11 to 16.

In particular, Examples 12 to 15, 17 and 19 each has a chromium oxide layer having a thickness of 20 nm to 200 nm (desirable range) and contain finely particulate manganese carbide and/or vanadium carbide having a particle diameter of 50 nm to 250 nm (desirable range). Thus, none of the ten samples underwent galling even after 200 hours of testing. In other words, it is thought that the desired effect of preventing the penetration of hydrogen exerted both by the chromium oxide layer and the finely particulate manganese carbide and/or vanadium carbide can be sufficiently obtained, making it possible to drastically prolong the galling life of the rolling bearing.

On the contrary, Examples 11, 16 and 18 exhibited an evaluation time (L10 life) which is longer than that of Comparative Examples 11 to 16 but is shorter than the calculated life.

Example 11 underwent galling mainly on the inner race. Three out of the ten samples underwent galling starting from the core of the steel material. These samples were examined for microstructure of section of the inner race which underwent galling. As a result, microcrack as well as whitening of texture were confirmed. The results are presumably attributed to the fact that Example 11 has a chromium oxide layer having a relatively small thickness (falling outside the desired range) and contains carbides having a relatively large particle diameter (falling outside the desired range) and thus is rendered less insusceptible to penetration of hydrogen than Examples 12 to 15, 17 and 19.

Example 16 underwent galling mainly on the inner race. Three out of the ten samples underwent galling starting from the core of the steel material. These samples were examined for microstructure of section of the inner race which underwent galling. As a result, the whitening of texture was observed all over the loaded area. The results are presumably attributed to the fact that Example 16 has a chromium oxide layer having a relatively large thickness (falling outside the desired range) which is not dense and thus is rendered less insusceptible to penetration of hydrogen than Examples 12 to 15, 17 and 19.

Example 18 underwent seizing in the proportion of 2 out of 10 samples. The results are presumably attributed to the fact that since Example 18 contains vanadium incorporated in the steel material used in an amount of as small as 0.3 wt % and is free of molybdenum and has vanadium and molybdenum carbides deposited therein in a small total amount, it cannot be rendered sufficiently resistant to abrasion in operation under lubrication conditions such that the lubricant is contaminated by water, which can easily destroy the lubricant layer.

Comparative Example 11 uses SUJ2 steel, which falls outside the scope of the present invention, has a chromium oxide layer having a thickness of as small as 1 nm and contains finely particulate vanadium carbide and molybdenum carbide having a large particle diameter. Thus, Comparative Example 11 exhibited an evaluation time of as short as ⅙ of the calculated life. All the ten samples underwent galling. These samples were then examined for microstructure of section of the inner race which underwent galling. As a result, microcrack as well as whitening of texture were confirmed.

Comparative Example 12 has a chromium oxide layer having a thickness of 51 nm but contains carbon in the steel material used in a small amount and hence exhibits an insufficient surface hardness (HRC 55) on the race track surface. As a result, the race track surface underwent plastic deformation when acted upon by shearing stress, shortening the galling life thereof.

Comparative Example 13 has a chromium oxide layer having a thickness of 25 nm but contains carbon in the steel material used in a large amount. Thus, huge carbides were produced on the surface of the steel material, and the chromium oxide layer was partially destroyed. As a result, the galling life was shortened. These samples were examined for microstructure of section of the inner race which underwent galling. As a result, microcrack as well as whitening of texture were confirmed.

Comparative Example 14 has a chromium oxide layer having a thickness of 105 nm but contains molybdenum in the steel material used in an amount falling outside the scope of the present invention and carbides having a particle diameter of as large as 500 nm. Thus, when operated under conditions such that the contamination by water makes it difficult to form a lubricant layer, the rolling bearing of Comparative Example 14 allows the molybdenum carbide to exert less strongly the effect of adsorbing hydrogen, shortening the galling life thereof.

Comparative Example 15 uses a steel material free of molybdenum and vanadium and allows no such carbides to be deposited. Further, Comparative Example 15 has a chromium oxide layer having a small thickness. Thus, the chromium oxide layer exerts an insufficient effect of preventing the penetration of hydrogen. Further, the desired effect of adsorbing hydrogen by molybdenum carbide or vanadium carbide cannot be exerted. As a result, the galling life was shortened.

Comparative Example 16 allows the effect of adsorbing hydrogen by the deposition of vanadium carbide but has a chromium oxide layer having a small thickness and hence allows an insufficient effect of preventing the penetration of hydrogen by chromium oxide layer. As a result, the galling life was shortened.

As can be seen in the foregoing results, a rolling bearing allows a sufficient effect of preventing the penetration of hydrogen by a chromium oxide layer and adsorbing hydrogen by finely particulate carbides and thus exhibits a prolonged galling life in operation under the lubrication at a high traction coefficient with water mixed therein so far as the steel material used meets the requirements of the present invention, a finely particulate molybdenum carbide and/or vanadium carbide having a particle diameter of 50 nm to 300 mm is distributed in the matrix, and a chromium oxide layer having a thickness of 5 nm to 300 nm is provided on the race track surface.

Examples 21 to 29
and

Comparative Examples 21 to 29

A steel material containing carbon (C), silicon (Si), manganese (Mn), chromium (Cr), molybdenum (Mo) and vanadium (V) in proportions (wt %) set forth in Table 5 below, phosphorus (P) and sulfur (S) each in a proportion of not more than 0.02 wt %, oxygen (O) in a proportion of not more than 0.0010 wt %, and the balance of iron (Fe) was used to produce an inner race and an outer race for deep race track surface ball bearing (JIS model number: 6206; outer diameter: 62 mm; inner diameter: 30 mm; width: 16 mm). The inner and outer races were produced by keeping the steel material as it is at a temperature of from 1,100° C. to 1,250° C. in a nonoxidizing atmosphere so that it was subjected to solid solution treatment, whereby finely particulate molybdenum and vanadium carbides are deposited and distributed in the matrix, and then cutting the material except for Comparative Example 21.

Subsequently, except for Comparative Example 21, these inner and outer races were subjected to carbonitriding, i.e., heat treatment at a temperature of from 880° C. to 960° C. in an atmosphere comprising endothermic gas, enriched gas and ammonia gas for 5 to 10 hours, and then allowed to cool. Subsequently, these inner and outer races were heated to a temperature of from 840° C. to 1,050° C. in an atmosphere of endothermic gas for 0.5 to 1 hour, and then subjected to oil hardening. Comparative Example 21 was merely subjected to hardening at a temperature of 840° C. and tempering at a temperature of 180° C. free from solid solution treatment and carbonitriding.

As a result of these heat treatments, surface hardness (HRC), surface carbon concentration (surface C) and retained austenite content (γR) set forth in Table 5 were obtained. Using an alumina-based grinding mill or CBN grinding mill, the inner race and outer race were then polished at the race track surface formed thereon at a high rotary speed so that the surface roughness of the race track surface was from 0.01 to 0.04 μmRa. The inner race and outer race thus polished were then measured for the properties of chromium oxide layer ($Cr_2O_3$) formed on the race track surface. The measurements are set forth in Table 5 below.

The finely particulate molybdenum carbide and/or vanadium carbide distributed in the matrix was then observed under a transmission electron microscope. The carbide particles were subjected to image analysis to confirm the average particle diameter and the number of particles. The average particle diameter is set forth in Table 5 below.

testing conditions, the testing load Fr was 580 kgf (P/C=0.3 according to JIS), the testing temperature was 80° C., the rotary speed was 3,900 rpm, and the inner race was rotated.

In some detail, stainless steel beads having a hardness Hv of 500 and a size of from 74 to 147 μm were added to 1,000 cc of the lubricant in the oil tank 6. The mixture was then stirred. The rolling bearing 1 in the shrouding member 4 was then allowed to operate for 3 minutes while being supplied with the lubricant free from the filter 63. In other words, the rolling bearing 1 was allowed to rotate under the lubrication at a high traction coefficient with foreign matters mixed therein so that initial dents were developed on the race track surface and/or the rolling surface.

Subsequently, the rolling bearing 1 was removed from the testing machine, and then cleaned. The inner race and rolling element were then replaced by new ones free of dents. The outer race thus initially dented was continued to be used. The rolling bearing 1 was then mounted on the testing machine. The filter 63 was mounted on the pipe 61. Under these conditions, the rolling bearing 1 in the shrouding member 4 was allowed to rotate while being supplied with the lubricant from the oil tank into which tap water was dropped at a rate

TABLE 5

| | | Chemical component (%) | | | | | | Chromium oxide layer | Mo, V carbides | Surface C | | γR |
|---|---|---|---|---|---|---|---|---|---|---|---|---|
| | | C | Si | Mn | Cr | Mo | V | (nm) | (nm) | (%) | HRC | (%) |
| Example No. | 21 | 0.25 | 0.10 | 0.31 | 5.0 | 4.0 | — | 5 | 125 | 1.20 | 58 | 45 |
| | 22 | 0.30 | 0.60 | 0.25 | 10.0 | — | 2.0 | 134 | 435 | 1.10 | 66 | 30 |
| | 23 | 0.55 | 0.25 | 0.48 | 8.2 | 2.2 | 1.5 | 300 | 355 | 1.15 | 67 | 35 |
| | 24 | 0.15 | 0.23 | 0.35 | 14.0 | 0.5 | — | 255 | 60 | 0.80 | 62 | 25 |
| | 25 | 0.45 | 0.43 | 0.61 | 10.5 | 1.1 | — | 24 | 143 | 1.15 | 61 | 40 |
| | 26 | 0.20 | 0.55 | 1.50 | 7.0 | 0.8 | 0.5 | 90 | 50 | 0.90 | 62 | 35 |
| | 27 | 0.10 | 1.40 | 0.35 | 12.5 | 0.5 | — | 200 | 70 | 0.70 | 62 | 25 |
| | 28 | 0.35 | 0.35 | 0.40 | 5.9 | 3.0 | 0.3 | 8 | 500 | 1.15 | 59 | 50 |
| | 29 | 0.25 | 0.33 | 0.29 | 13.8 | — | 0.5 | 155 | 85 | 0.90 | 63 | 30 |
| Comparative Example No. | 21 | 0.93 | 0.32 | 0.41 | 1.5 | 0.2 | — | 1 | 810 | — | 62 | 8 |
| | 22 | 0.05 | 0.35 | 0.30 | 11.0 | 1.0 | — | 51 | 155 | 0.60 | 55 | 25 |
| | 23 | 0.70 | 0.45 | 0.50 | 12.0 | 0.5 | 0.5 | 25 | 79 | 1.55 | 67 | 35 |
| | 24 | 0.35 | 0.32 | 0.45 | 3.5 | 1.0 | 1.0 | 2 | 500 | 1.10 | 67 | 30 |
| | 25 | 0.45 | 0.40 | 0.35 | 18.0 | 1.5 | — | 100 | 225 | 1.05 | 63 | 35 |
| | 26 | 0.40 | 0.35 | 0.50 | 13.0 | — | — | 100 | — | 1.15 | 62 | 10 |

As a rolling element there was used one obtained by a process of forming a ball having a diameter of ⅜ inch from a second kind of high carbon chromium bearing steel (SUJ2), and then subjecting the ball to hardening and tempering so that the surface hardness (HRC), the amount of retained austenite (γR) and the surface roughness of the race track surface were adjusted to 62, 10 vol. % and from 0.003 to 0.010 μmRa, respectively.

Rolling bearings composed of these inner races and outer races thus obtained (Examples 21 to 29 and Comparative Examples 21 to 26) and the foregoing rolling element were each mounted on a testing machine shown in FIG. 1. Under these conditions, these rolling bearings were then examined for galling life in operation under the lubrication at a high traction coefficient with foreign matters and water mixed therein.

As the lubricant there was used a commercially available traction oil having a maximum traction coefficient ($\mu$) of 0.09 at 40° C. and 0.07 at 100° C. and a dynamic viscosity of 30.8 cSt at 40° C. and 5.31 cSt at 100° C. as determined at a circumferential speed of 4.1 m/s and a percent slippage of 5% using a two-cylinder testing machine. Referring to the of 5 cc per hour. In this arrangement, the rolling bearing 1 in the shrouding member 4 was supplied with a lubricant free of foreign matters but containing water.

During the rotary test, vibration developed on the bearing was measured. When the vibration during rotation reached 5 times the initial value, the test was suspended to see if flaking occurred. 10 sets of bearings were tested for each of the examples and comparative examples.

If the test was suspended, the rotation time required until then was used for evaluation (galling life). For those which have a calculated life of 160 hours and thus were tested for 200 hours during which the vibration didn't reach 5 times the initial value, examination was made to see if flaking occurred after 200 hours of rotation. Thus, 200 hours were used for evaluation. The results are set forth in Table 6 below.

TABLE 6

|  |  | Evaluation time L10 (hr) | Occurrence of galling | Form of galling |
|---|---|---|---|---|
| Example No. | 21 | 165 | 3/10 inner race galled | Started from the core |
|  | 22 | 200 | Not galled | — |
|  | 23 | 178 | 2/10 inner race galled | Started from the core |
|  | 24 | 200 | Not galled | — |
|  | 25 | 200 | Not galled | — |
|  | 26 | 175 | 2/10 inner race galled | Started from the core |
|  | 27 | 200 | Not galled | — |
|  | 28 | 160 | 3/10 inner race galled | Started from the core |
|  | 29 | 200 | Not galled | — |
| Comparative Example No. | 21 | 13 | 10/10 inner race galled | Started from the core and surface layer |
|  | 22 | 23 | 10/10 inner race galled | Started from the core |
|  | 23 | 30 | 10/10 inner race galled | Started from the core |
|  | 24 | 21 | 10/10 inner race galled | Started from the core |
|  | 25 | 51 | 10/10 inner race galled | Started from the core |
|  | 26 | 78 | 10/10 inner race galled | Started from the core |

As can be seen in the table above, since Example 21 to 29 each is formed of a steel material meeting the requirements of the present invention and have a chromium oxide layer having a thickness of 5 nm to 300 nm and finely particulate molybdenum carbide and/or vanadium carbide having a particle diameter of 50 nm to 300 nm distributed in the matrix, they exhibit a prolonged galling life as compared with Comparative Examples 21 to 26.

In particular, in Examples 22, 24, 25, 27 and 29, none of the ten samples underwent galling even after 200 hours of testing. This is attributed to the fact that the chromium oxide layer has a thickness of as great as 8 nm to 255 nm and thus is dense and can be hardly destroyed and the particle diameter of the finely particulate molybdenum carbide and/or vanadium carbide is from 60 nm to 435 nm. In other words, since even if the chromium oxide layer is destroyed, a sufficient effect of preventing the penetration of hydrogen by finely particulate molybdenum carbide and/or vanadium carbide can be exerted, the galling life in operation under the lubrication at a high traction coefficient with water mixed therein can be drastically prolonged.

On the contrary, Examples 21, 23, 26 and 28 exhibited an evaluation time (L10 life) of not shorter than the calculated life but falling below 200 hours.

Example 21 didn't undergo galling starting from the dents developed on the race track surface or the outer race during the operation under the lubrication with foreign matters mixed therein. Instead, galling occurred mainly on the inner race. Three out of the ten samples underwent galling starting from the core of the steel material. These samples were examined for microstructure of section of the inner race which underwent galling. As a result, microcrack as well as whitening of texture were confirmed. These results are presumably attributed to the face that the chromium oxide layer thus formed has a thickness of as relatively small as 5 nm and then exerts a lessened effect of preventing the penetration of hydrogen as compared with Examples 22, 24, 25, 27 and 29.

Example 23 underwent galling mainly on the inner race. Two out of the ten samples underwent galling starting from the core of the steel material. These samples were examined for microstructure of section of the inner race which underwent galling. As a result, the whitening of texture was observed all over the loaded area. The results are presumably attributed to the fact that since Example 23 has a chromium oxide layer having a thickness as relatively large as 300 nm which is not dense and thus suffers from partial destruction of chromium oxide layer, it is rendered less insusceptible to penetration of hydrogen than Examples 22, 24, 25, 27 and 29.

Example 26 underwent galling mainly on the inner race. Two out of the ten samples underwent galling starting from the core of the steel material. These samples were examined for microstructure of section of the inner race which underwent galling. As a result, microcrack as well as whitening of texture were confirmed. The results are presumably attributed to the fact that since Example 26 has a chromium oxide layer having a thickness as relatively small as 90 nm and contains finely particulate vanadium carbide and molybdenum carbide having a particle diameter of as relatively small as 50 nm, it is rendered less insusceptible to penetration of hydrogen than Examples 22, 24, 25, 27 and 29.

Example 28 underwent galling mainly on the inner race. Three out of the ten samples underwent galling starting from the core of the steel material. These samples were examined for microstructure of section of the inner race which underwent galling. As a result, microcrack as well as whitening of texture were confirmed. The results are presumably attributed to the fact that since Example 28 has a chromium oxide layer having a thickness as relatively small as 8 nm and contains finely particulate vanadium carbide and molybdenum carbide having a particle diameter of as relatively large as 500 nm, it is rendered less insusceptible to penetration of hydrogen than Examples 22, 24, 25, 27 and 29.

Comparative Example 21 uses SUJ2 steel, which deviates from the scope of the present invention, has a chromium oxide layer having a thickness of as small as 1 nm and contains finely particulate vanadium carbide and molybdenum carbide having a large particle diameter. Thus, the steel material of Comparative Example 21 exhibited an evaluation time of as short as $\frac{1}{12}$ of the calculated life, and all the ten samples underwent galling. These samples were examined for microstructure of section of the inner race which underwent galling. As a result, microcrack as well as whitening of texture were confirmed. These samples underwent galling starting from the core of the steel material as well as from the dents on the surface thereof.

Comparative Example 22 has a chromium oxide layer having a thickness of 51 nm but contains carbon incorporated in the steel material used in a small amount and has a surface carbon concentration of as low as 0.60%. Thus, the surface hardness of the race track surface was insufficient (HRC 55). The race track surface underwent plastic deformation when acted upon by shearing stress. As a result, all the ten samples underwent galling on the inner race starting from the core of the steel material. Thus, the galling life was shortened.

Comparative Example 23 has a chromium oxide layer having a thickness of 25 nm but comprises carbon incorporated in the steel material used in a large amount and has a surface carbon concentration of as high as 1.55%. Thus, huge carbides having a size of greater than 10 μm were produced on the surface of the steel material, and the chromium oxide layer was partially destroyed. As a result, all the ten samples underwent galling on the inner race starting from the core of the steel material. Thus, the galling life was shortened. These samples were examined for microstructure of section of the inner race which underwent galling. As a result, microcrack as well as whitening of texture were confirmed.

Comparative Example 24 has a chromium oxide layer having a thickness of as small as 2 nm which is not dense. Thus, Comparative Example 24 allows a lessened effect of preventing the penetration of hydrogen by chromium oxide layer. In addition, the particle diameter of the finely particulate vanadium carbide and molybdenum carbide distributed in the matrix is as large as 500 nm, lessening the effect of adsorbing hydrogen by vanadium carbide and molybdenum carbide after the destruction of the chromium oxide layer. As a result, all the ten samples underwent galling on the inner race starting from the core of the steel material. Thus, the galling life was shortened.

Comparative Example 25 contains chromium incorporated in the steel material used in an amount of as high as 18.0%. Thus, huge chromium carbides having a size of greater than 10 μm were produced on the surface of the steel material. As a result, the chromium oxide layer was immediately destroyed due to its poor uniformity although it had a thickness of as sufficient as 100 nm.

Comparative Example 26 has no finely particulate molybdenum carbide and vanadium carbide distributed in the matrix. Further, the thickness of the chromium oxide layer is as sufficient as 100 nm, but the retained austenite content is as small as 10%. As a result, all the ten samples underwent galling on the inner race starting from the dents on the surface thereof. Thus, the galling life was shortened.

As can be seen in the foregoing description, an inner race and outer race allow a sufficient effect of preventing the penetration of hydrogen by chromium oxide layer and adsorbing hydrogen by finely particulate carbides after the destruction of chromium oxide layer, making it possible to prolong the galling life in operation under the lubrication at a high traction coefficient with foreign matters and water mixed therein so far as the steel material used falls within the scope of the present invention, a finely particulate molybdenum carbide and/or vanadium carbide having a particle diameter of from not less than 50 nm to not more than 300 nm is distributed in the matrix, a chromium oxide layer having a thickness of 5 nm to 300 nm is provided on the race track surface, the content of retained austenite in the surface of the steel material used is from 25 vol. % to 50 vol. %, and the surface carbon concentration is from 0.7 wt % to 1.2 wt %. In particular, if the content of chromium in the steel material used is from 10 wt % to than 14 wt %, it can be expected that the inner race and outer race can exhibit a drastically prolonged galling life in operation under the lubrication at a high traction coefficient with foreign matters and water mixed therein.

It was further confirmed that even if carburizing is effected instead of carbonitriding as effected in Examples 21 to 29, the same results as mentioned above are obtained. This carburizing was carried out by heating the material to a temperature of from 880° C. to 960° C. in an atmosphere containing endothermic gas and enriched gas for 10 to 15 hours. The subsequent hardening and tempering were effected under the same conditions as with that after the foregoing carbonitriding.

Further, if the content of chromium in the steel material used is too high, chromium carbide is produced on the surface thereof, giving a tendency that the penetration and diffusion of carbon into the surface thereof can be inhibited during carburizing or carbonitriding, making it difficult to perform sufficient carburizing. In this case, the steel material can then be subjected to vacuum carburizing, plasma carburizing, acetylene carburizing, etc. to obtain better carburizing properties.

In the foregoing various examples, deep race track surface ball bearing was used for testing. However, the same effects can be expected for cylindrical roller bearing, tapered roller bearing and angular bearing, which suffer from higher slippage that can deteriorate the lubrication conditions.

What is claimed is:

1. A rolling bearing comprising an inner race, an outer race and a rolling element, at least one of said inner race, said outer race and said rolling element being obtained by forming from a steel material containing carbon (C) of 0.55 wt % to 1.10 wt % and chromium (Cr) of 2.0 wt % to 9.0 wt %, and then subjecting the material thus formed to hardening, tempering and polishing;

wherein a chromium oxide ($Cr_2O_3$) layer having a thickness of 5 nm to 300 nm is provided on at least one of a race track surface of said inner race, a race track surface of said outer race and a rolling surface of said rolling element.

2. The rolling bearing according to claim 1, wherein an amount of austenite retained in at least one of the race track surface of said inner race, the race track surface of said outer race and the rolling surface of said rolling element is in the range of 15 vol. % to 25 vol. %.

3. A rolling bearing comprising an inner race, an outer race and a rolling element, at least one of said inner race, said outer race and said rolling element being obtained by forming from a steel material containing carbon (C) of 0.55 wt % to 1.10 wt %, chromium (Cr) of 2.0 wt % to 9.0 wt % and at least one of molybdenum (Mo) of 1.1 wt % to 4.0 wt %, vanadium (V) of 0.3 wt % to 2.0 wt %, and then subjecting the material thus formed to hardening, tempering and polishing;

wherein at least one of a finely particulate molybdenum carbide and a finely particulate vanadium carbide having a particle diameter of 50 nm to 300 nm is distributed in a matrix; and a chromium oxide ($Cr_2O_3$) layer having a thickness of 5 nm to 300 nm is provided on at least one of a race track surface of said inner race, a race track surface of said outer race and a rolling surface of said rolling element.

4. A rolling bearing comprising an inner race, an outer race and a rolling element, at least one of said inner race, said outer race and said rolling element being obtained by forming from a steel material containing a carbon (C) of 0.10 wt % to 0.55 wt % and a chromium (Cr) of 5.0 wt % to 14.0 wt %, and then subjecting the material thus formed to carburizing or carbonitriding, hardening, tempering and polishing;

wherein said at least one of the inner race, the outer race and the rolling element after carburizing or carbonitriding has a surface carbon concentration of 0.7 wt % to 1.2 wt %; an amount of austenite retained in a race track surface of said inner race, a race track surface of said outer race and a rolling surface of said rolling element is in the range of 25 vol. % to 50 vol. %; and a chromium oxide ($Cr_2O_3$) layer having a thickness of 5 nm to 300 nm is provided on at least one of a race track surface of said inner race, a race track surface of said inner race and a rolling surface of said rolling element.

5. A rolling bearing comprising an inner race, an outer race and a rolling element, at least one of said inner race, said outer race and said rolling element being obtained by forming from a steel material containing carbon (c) of 0.10 wt % to 0.55 wt %, chromium (Cr) of 5.0 wt % to 14.0 wt %, and at least one of molybdenum (Mo) of 0.5 wt % to 4.0 wt % and vanadium (V) of 0.3 wt % to 2.0 wt %, and then subjecting at least one of the inner race, the outer race and the rolling element to carburizing or carbonitriding, hardening, tempering and polishing;

wherein at least one of a finely particulate molybdenum carbide and a finely particulate vanadium carbide having a particle diameter in the range of 50 nm to 500 nm is distributed in a matrix; the material after carburizing or carbonitriding has a surface carbon concentration of 0.7 wt % to 1.2 wt %; an amount of austenite retained in a race track surface of said inner race, a race track surface of said outer race and a rolling surface of said rolling element is in the range of 25 vol. % to 50 vol. %; and a chromium oxide ($Cr_2O_3$) layer having a thickness of 5 nm to 300 nm is provided on the race track surface of said inner race, the race track surface of said outer race and a rolling surface of said rolling element.

6. A rolling bearing according to claim 3, wherein the finely particulate molybdenum carbide and/or vanadium carbide is distributed in the matrix in a proportion of not less than 10 particles per 10 $\mu m^2$ on the race track surface and/or rolling surface.

7. A rolling bearing according to claim 5, wherein the finely particulate molybdenum carbide and/or vanadium carbide is distributed in the matrix in a proportion of not less than 10 particles per 10 $\mu m^2$ on the race track surface and/or rolling surface.

* * * * *